April 19, 1960 H. STRICKHOLM 2,933,557

FACSIMILE TRANSMITTER

Filed April 8, 1957

INVENTOR.
H. STRICKHOLM
BY E. R. Evans
his attorney 2,933,557

FACSIMILE TRANSMITTER

Harry Strickholm, Great Neck, N.Y., assignor, by mesne assignments, to Timer Facsimile Corporation, New York, N.Y., a corporation of Delaware Application April 8, 1957, Serial No. 651,372

8 Claims. (Cl. 178—7.1)

This invention relates to facsimile transmitters and more particularly to improvements in the blank loading and control mechanisms for such transmitters.

In general terms the object of the invention is to provide in a facsimile transmitter an improved arrangement for positioning, automatically feeding and ejecting a sheet of copy in relation to the optical scanning system; and for properly controlling the operation of the transmitter if the transmitting cycle is accidentally initiated without inserting a sheet of copy in the transmitter.

Another object of the invention is to provide an improved arrangement for transmitting copy, which is wholly automatic once the copy sheet is inserted in the transmitter and the manually operable "start" mechanism is actuated.

Another object of the invention is to provide an improved construction embodying a single manually operable control member for controlling both the electrical and mechanical elements of the transmitter, it being only necessary to insert the copy sheet and actuate the manually operable member in order to effect transmission of the copy.

A feature of the invention relates to a novel arrangement for controlling the scanning and mechanical feeding of the copy at the same time as the transmitter generates the control signals for the connected recorder, such as start, phasing and stop signals.

Figure 1:
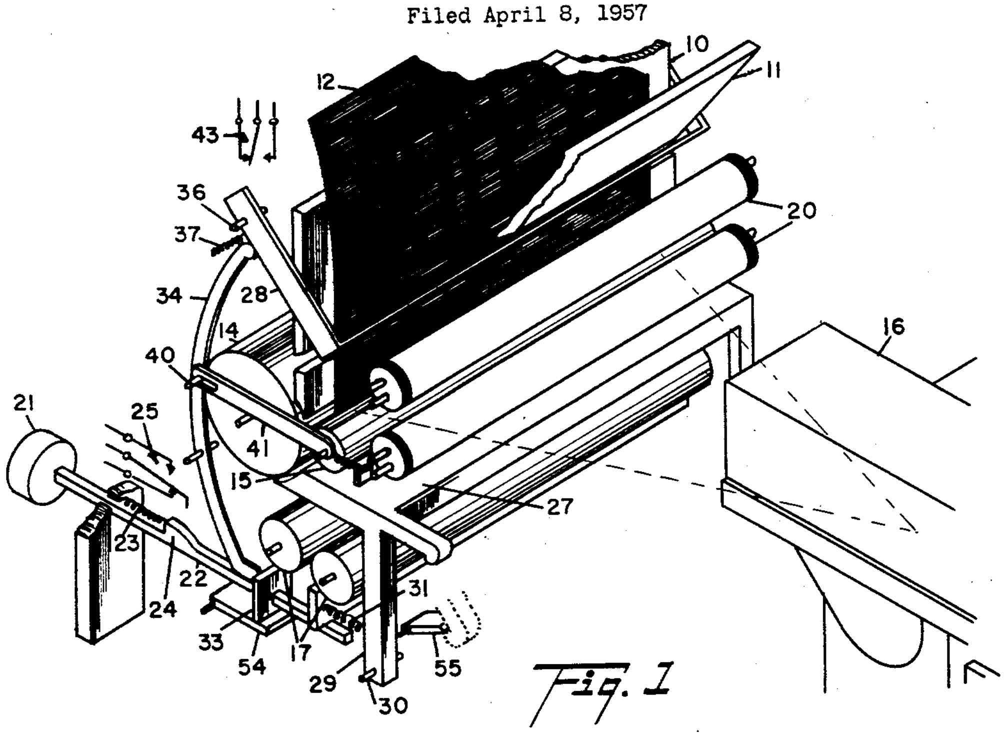
Figure 2:
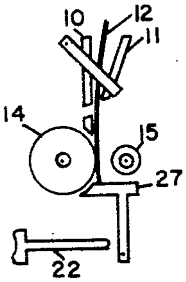
Figures 3, 5:
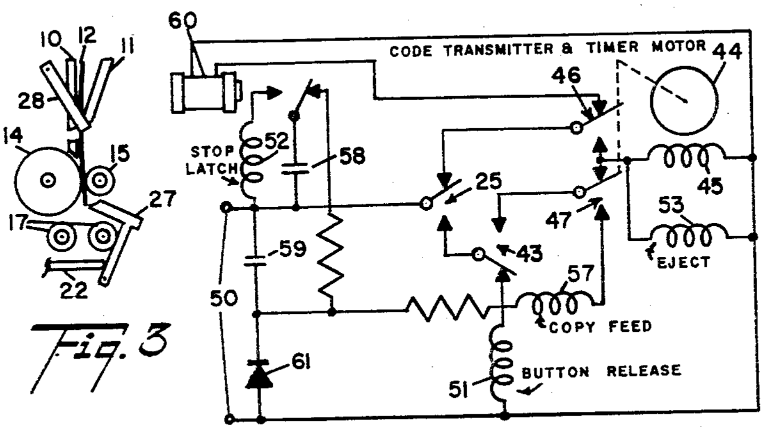
Figure 4:
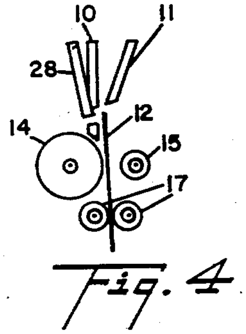

Other objects and advantages of the invention will become apparent from consideration of the preferred modification shown in the accompanying drawing, wherein:

Fig. 1 is a perspective view of a transmitter embodying the invention;

Figs. 2 3, and 4 are detail views of mechanical elements of the transmitter shown in Fig. 1, and Fig. 5 is a diagram of the control circuits employed in the transmitter of Fig. 1.

Referring to Fig. 1, the transmitter embodying the invention may comprise essentially two plate members 10 and 11 defining a slot or feed opening for the sheet of copy 12, a pair of rotatable feed rollers 14 and 15 for advancing the copy through the scanning area of the optical scanning mechanism 16 and a second pair of auxiliary feed rollers 17 mounted after the feed rollers 14 and 15. For purposes of illustration, a flat scanner is shown in which the copy 12 is presented in successive scanning lines to the scanning means 16 as the copy is advanced at a uniform rate by the feed rollers. The optical scanning system 16 is not shown in detail since conventional scanning mechanisms of this type are known in the art. One example of a flat scanner which may be used in the transmitter of the present invention is shown in the prior patent to Herriott, No. 2,262,584, dated November 11, 1941. See also Rosing No. 1,161,734, dated November 23, 1915. In transmitters of this type, the scanning area which is shown as illuminated by the elongated tubular lamps 20, and the scanning system itself are enclosed in a light-tight container or casing which is omitted from the drawing for the sake of simplicity.

The flat transmitter shown in Fig. 1 further comprises a manually operable push button 21, the stem 22 of which is biased to the left by the spring 23 and is adapted to operate mechanical and electrical elements involved in the starting of the transmitter and its associated receiver (not shown). As shown the cam portion 24 of the stem 22 is arranged to operate the contacts 25 when the push button 21 is depressed. The depression of the push button 21 further operates the mechanical elements associated with the feed rollers 14 and 15, the stop bar 27 and the end-of-copy feeler member 28 so that it is only necessary to insert a sheet of copy in the transmitter and depress the manually operable push button 21 to render the transmitter operative for a transmitting cycle, at the end of which the end-of-copy feeler member 28 is cleared by the top of the sheet of copy and becomes effective, stopping the transmitter and terminating the transmitting cycle.

To this end, in accordance with the invention, the stem 22 of the push button 21 extends up to the vertical supporting leg 29 of the pivoted stop bar 27 so that when the button is depressed, the stop bar 27 is rocked about the pivot 30 against the tension of a spring 31. This removes the stop bar 27 from its normal position where it lies in the path of the copy 12 and serves to position the copy when it is inserted in the transmitter. As shown more clearly in the diagrammatic representation in Figs. 2 and 3, the stop bar 27 is pushed backwards until the sheet of copy 12 may be fed by the feed rollers 14 and 15 past the scanning area of the scanning system 16. The feed roller 15 is normally out of engagement with the sheet of copy before the transmitter is started, thus permitting the leading edge of the sheet of copy to be dropped against the stop bar 27. However when the push button 21 is depressed, the plate or lug 33 on the stem 22 is moved aside to permit the pivoted rocker arm 34 to turn in a counterclockwise direction, thereby releasing the end-of-copy feeler member 28 which is pivoted at 36 and biased to rest against the surface of the copy sheet by a spring 37.

The rocker arm 34 is further provided with a projecting pin or lug 40 which is coupled through a link 41 to the pivot of the feed roller 15. It will be apparent that when the rocker arm 34 turns about its pivot as described, the link 41 releases the feed roller 15 with its biasing spring into frictional engagement with the copy sheet 12. Since both feed rollers 14 and 15 are rotatable and one or both is driven by conventional means (not shown), the copy sheet will be advanced through the scanning area at a rate determined by the speed of rotation of the feed rollers 14 and 15. During the transmitting cycle, the end-of-copy feeler member 28 is prevented from swinging through the slot in the plate 10 and operating the contacts 43 by its engagement with the copy sheet. However when the end of the copy sheet clears the transverse portion of the feeler member 28 as shown in Figs. 3 and 4, the member 28 swings through the slot in the plate 10 and operates the contacts 43 to stop transmission. At the same time, as indicated in Fig. 4, the auxiliary feed rollers 17 are acuated to engage the copy sheet 12 and feed it out of the transmitter unit.

If desired the transmitter may be designed to send code signals for turning on a normally inactivated receiver and for phasing and starting the recording mechanism of said receiver. Systems of this kind in general use are described in the patent to K. R. McConnel and P. R. Marzan, No. 2,640,874, dated June 2, 1953, and assigned to the assignee of the present application; and in the co-pending application of the same inventors, Serial No. 351,184, now patented, No. 2,860,180, dated November 11, 1958. These prior disclosures are not necessary for an understanding of the present invention but serve to make it clear that in many instances a transmitter which sends a control signal or a series of such signals to its connected receiver may simplify the operation and manual supervision of the system and, therefore, serve a definite need. In order for such a system to function properly, the transmitter should be constructed so as to be reset to normal at the end of the transmitting cycle and this is an additional feature of the present invention.

An exemplary form of transmitter control circuit is shown diagrammatically in Fig. 5. In this diagram the contacts 25 and 43 of Fig. 1 are shown in the circuit which also includes a code transmitter and timer motor 44 having an operating circuit 45 and being connected to cam operated contacts 46 and 47 which are operated in a predetermined sequence and time relationship to control the transmitter of Fig. 1 and to transmit control signals to the connected receiver. The diagrammatic system includes input terminals 50, for example of some available power source, and three coils or solenoids 51, 52 and 53 which are operative to unlatch or release the push button 21 and the stop member 27, and to operate the auxiliary feed out rolls 17 respectively. For example in Fig. 1, a pivoted latch 54 is shown for holding the stem 22 of the push button 21 in its depressed position, said latch being for example attracted by the solenoid 51 to release the push button which is then retracted to its normal or inactive position by the spring 23. A similar pivoted latch 55 is shown in Fig. 1 for latching the stop bar 27 in its operative position, said latch 55 for example being released by the solenoid 52 when the latter becomes energized. Similarly the solenoid 53 is connected to the auxiliary feed rolls 17 by an obvious connection to move said rollers against the surface of the copy sheet as long as the solenoid 53 is energized. The diagram further includes a solenoid 57 which may be arranged to connect one or both of the feed rollers 14 or 15 to a driving motor to start feeding of the copy in case this does not occur immediately after the manually operable push button 21 is depressed (for example, where it is desired to send start and phasing signals to the connected receiver under the control of timer motor 44 before actual transmission of copy signals from the optical scanning system 16 commences). The system further includes capacitors 58 and 59, a relay 60 and a rectifier 61, the purpose of which will be described.

The operation of the electrical components of the system shown in Fig. 5 is as follows: When the push button 21 is depressed, the switch 25 is actuated from the normal position shown which closes a circuit through the upper contact of the switch 43 and the upper contact of the switch 47, connecting the input terminals 50 to the winding 45 of the timer motor and said motor commences its timing cycle. The push button 21 actuates the stop bar 27 towards its rearward position where it is held by the latch member 55 and also tilts the rocker arm 34 as above described to release the feeler member 28. If the push button 21 is depressed when there is no copy sheet 12 in the transmitter, the end-of-copy feeler member 28 is not held in the position shown in Figs. 1 and 3 by the copy sheet and actuates the contacts of the switch 43 to cut off the transmission. The circuit for the button release coil may be traced from the terminals 50 through the lower contact of the switch 25 and the lower contact of the switch 43. This releases the latch member 54 from engagement with the lug or plate 33, thus instantly releasing the push button. The opening of the upper contact of switch 43 interrupts the circuit of the code transmitter and timer motor 44 so that the transmitter does not run through the transmitting cycle and the remote receiver is not activated by the usual start and phase signals.

The code transmitter and timer motor 44 first operates the upper contacts 46 and switches on the control tone signals for phasing the recorder and then the facsimile signal from the scanning mechanism 16. After the facsimile signal is connected to the output terminals of the transmitter in this manner, the motor 44 operates contacts 47, causing the timer motor to stop rotating and energizing the solenoid 57 to start the feed roller 15 operating to feed the copy.

When the end of the copy clears the end-of-copy feeler member 28, said member 28 passes through the slot in the plate 10, as indicated in Figs. 3 and 4, and operates the end-of-copy switch 43. This opens the circuit of the feed solenoid 57 and closes the circuit of the push button release solenoid 51. The solenoid 51 attracts the latch member 54 to release the push button 21 and the operate switch 25 is restored to normal. This deenergizes the push button release solenoid 51 and recloses the circuit of the timer motor 44 through the lower contact of the switch 46 operated by the timer. At the same time, as indicated in Fig. 4, the auxiliary feed rolls 17 are operated by solenoid 53 to engage the copy sheet 12 and feed out the copy which has been transmitted. Subsequently the timer restores the contact 47 to normal and opens the signaling circuit from the transmitter. If a stop-tone control signal is employed for stopping the connected receiver, the timer switches on this signal when the facsimile signal is terminated. At the end of the stop-tone control signal, the timer 44 releases cam switch 46, opening the lower contact in the circuit of the motor winding 45 and closing the upper contact in series with the control relay 60. At the instant of contact relay 60 attracts its armature and closes a momentary circuit to the stop latch solenoid 52, and the capacitor 58 which has been charged through the rectifier 61 is discharged through the contact of relay 60 into solenoid 52, thereby releasing the latch 55 from the stop bar. The stop bar 27 swings back to its normal position ready for the next sheet of copy.

It will be apparent that in accordance with the invention, a relatively simple structural arrangement provides for completely automatic operation of a facsimile transmitter or the like after the copy sheet has been inserted in the feed opening provided and the manually operable push button is depressed. While the construction of a preferred embodiment of the invention has been described in detail for the purpose of explaining the principles thereof, various changes and modifications will occur to those skilled in the art and may be made without departing from the spirit and scope of the invention.

I claim:

1. In a facsimile transmitter of the character described, optical copy scanning means, means defining a rectilinear elongated feed opening to receive copy to be transmitted, means including a rotatable feed roll alined with said feed opening for advancing a copy sheet inserted into said opening past said scanning means, a stop bar alined with said feed opening for positioning the leading edge of the copy sheet in desired relation to said optical scanning means, manually operable means for starting the transmitting cycle of the transmitter and simultaneously disengaging the stop bar from the edge of the copy sheet to permit said sheet to advance for scanning and means to interrupt the transmitting cycle if the manually operable means is actuated at a time when no copy sheet has been inserted into said feed opening.

2. In a facsimile transmitter of the character described, a code transmitter for generating receiver start and phasing control signals, optical copy scanning means, means to receive a sheet of copy to be transmitted and position the leading edge thereof in predetermined relation to said copy scanning means, a rotatable feed roll for advancing said sheet of copy past the copy scanning means, means for moving said rotatable feed roll into frictional engagement with said sheet of copy to advance said sheet, an operating circuit for rendering said code transmitter operative, manually operable means for simultaneouslly actuating said feed roll means and closing the operating circuit of said code transmitter, and means including an end-of-copy feeler member for restoring said manually operable means to normal, disengaging said feed roll from the sheet of copy and opening the operating circuit of said code transmitter.

3. In a facsimile transmitter of the character described, for use with a normally inactivated receiver, means for generating a control signal adapted to render the connected receiver operative to receive, optical line-by-line copy scanning means for sidewise scanning of the copy, copy feeding means for advancing a sheet of copy past said copy scanning means, manually operable means for conjointly starting the control signal generating means and the copy feeding means, and means for preventing the operation of the control signal generating means if said manually operable means is actuated when there is no copy in the transmitter.

4. In a facsimile transmitter according to claim 3, in which the means for preventing the operation of the control signal generating means comprises a pivoted feeler member mounted in a position to engage the surface of the copy sheet and mechanically interlocked with the manually operable means.

5. A facsimile transmitter according to claim 4, in which said feeler member operates as an end-of-copy transmitter stop control when the copy feeding means advances the trailing end of the copy sheet past said member.

6. In a facsimile transmitter of the character described, optical copy scanning means, copy feeding means for advancing a sheet of copy for line-by-line flat scanning by said copy scanning means, manually operable means for initiating the operation of the transmitter and of the copy feeding means, a movable feeler member interconnected with said manually operable means, means for engaging said feeler member with the surface of the copy sheet when said manually operable means is operated to start the transmitter and means including said feeler member to stop the transmitter when said copy feeding means advances the trailing end of the copy sheet past the feeler member at the end of copy transmission.

7. A facsimile transmitter according to claim 6, in which are provided additional copy feeding means after said first-mentioned copy feeding means and means to render said additional copy feeding means operative to feed out the copy sheet in response to the operation of said end-of-copy transmitter stop means, thereby clearing the scanning and normal feeding elements of the transmitter.

8. In a facsimile transmitter of the character described, optical copy scanning means, a stop bar for positioning the leading edge of a sheet of copy in desired relation to said copy scanning means at the commencement of a transmission, a rotatable feed roller and an end-of-copy feeler member normally spaced from said copy sheet but engageable therewith, means including a manually operable push button for moving said stop bar out of the path of said sheet of copy and for engaging said feed roller and end-of-copy feeler member with the sheet, and means including said end-of-copy feeler member for stopping the transmitter when copy scanning is finished.

References Cited in the file of this patent

UNITED STATES PATENTS

| | | |
|---|---|---|
| 2,262,715 | Wise et al. | Nov. 11, 1941 |
| 2,451,080 | Finch et al. | Oct. 12, 1948 |
| 2,511,892 | Wise | June 20, 1950 |
| 2,811,353 | Alden | Oct. 29, 1957 |

UNITED STATES PATENT OFFICE

CERTIFICATE OF CORRECTION

Patent No. 2,933,557 April 19, 1960

Harry Strickholm

It is hereby certified that error appears in the above numbered patent requiring correction and that the said Letters Patent should read as corrected below.

In the grant, lines 2, 3, and 12, and in the heading to the printed specification, line 4, name of assignee, for "Timer Facsimile Corporation", each occurrence, read -- Times Facsimile Corporation --.

Signed and sealed this 4th day of October 1960.

(SEAL)

Attest:

KARL H. AXLINE
Attesting Officer

ROBERT C. WATSON
Commissioner of Patents